Nov. 22, 1960 J. D. NOTHSTINE 2,961,072
DISK BRAKE
Filed Feb. 3, 1958 6 Sheets-Sheet 1
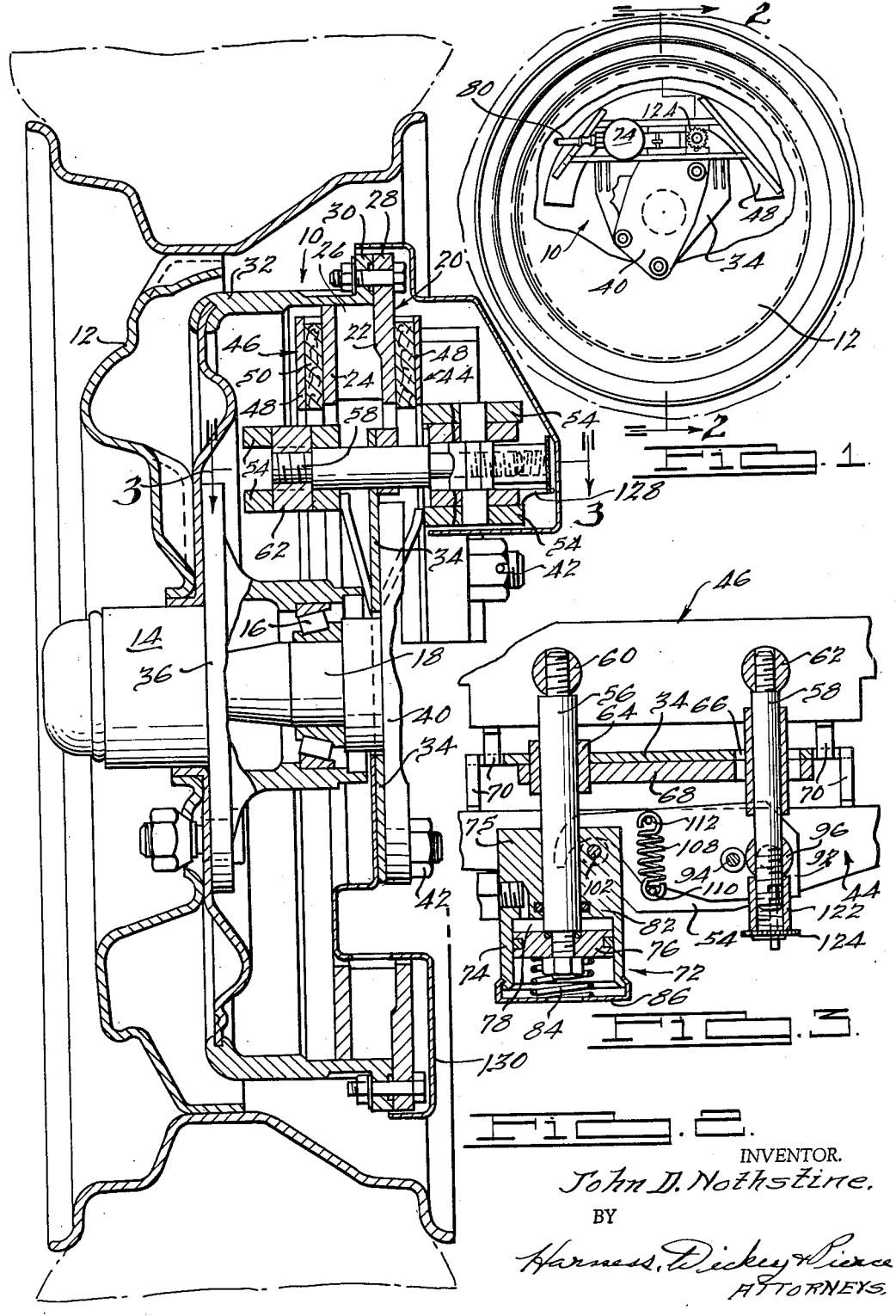
INVENTOR.
John D. Nothstine.
BY
Harness, Dickey & Pierce
ATTORNEYS.

Nov. 22, 1960 J. D. NOTHSTINE 2,961,072
DISK BRAKE
Filed Feb. 3, 1958 6 Sheets-Sheet 2

INVENTOR.
John D. Nothstine,
BY
Harness, Dickey & Pierce
ATTORNEYS.

Nov. 22, 1960   J. D. NOTHSTINE   2,961,072
DISK BRAKE
Filed Feb. 3, 1958   6 Sheets-Sheet 3
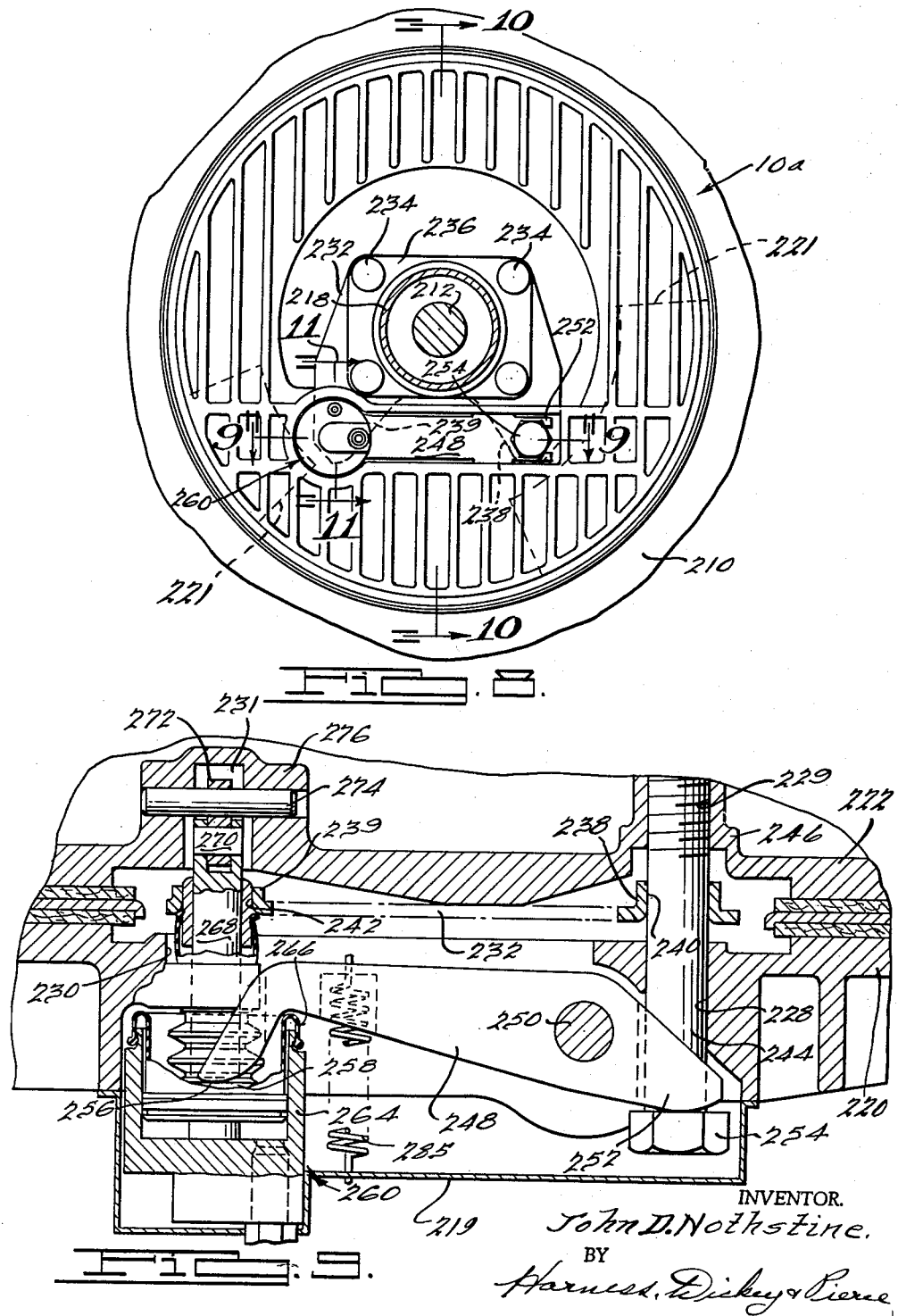
INVENTOR.
John D. Nothstine.
BY
Harness, Dickey & Pierce
ATTORNEYS Nov. 22, 1960 J. D. NOTHSTINE 2,961,072
DISK BRAKE
Filed Feb. 3, 1958 6 Sheets-Sheet 4
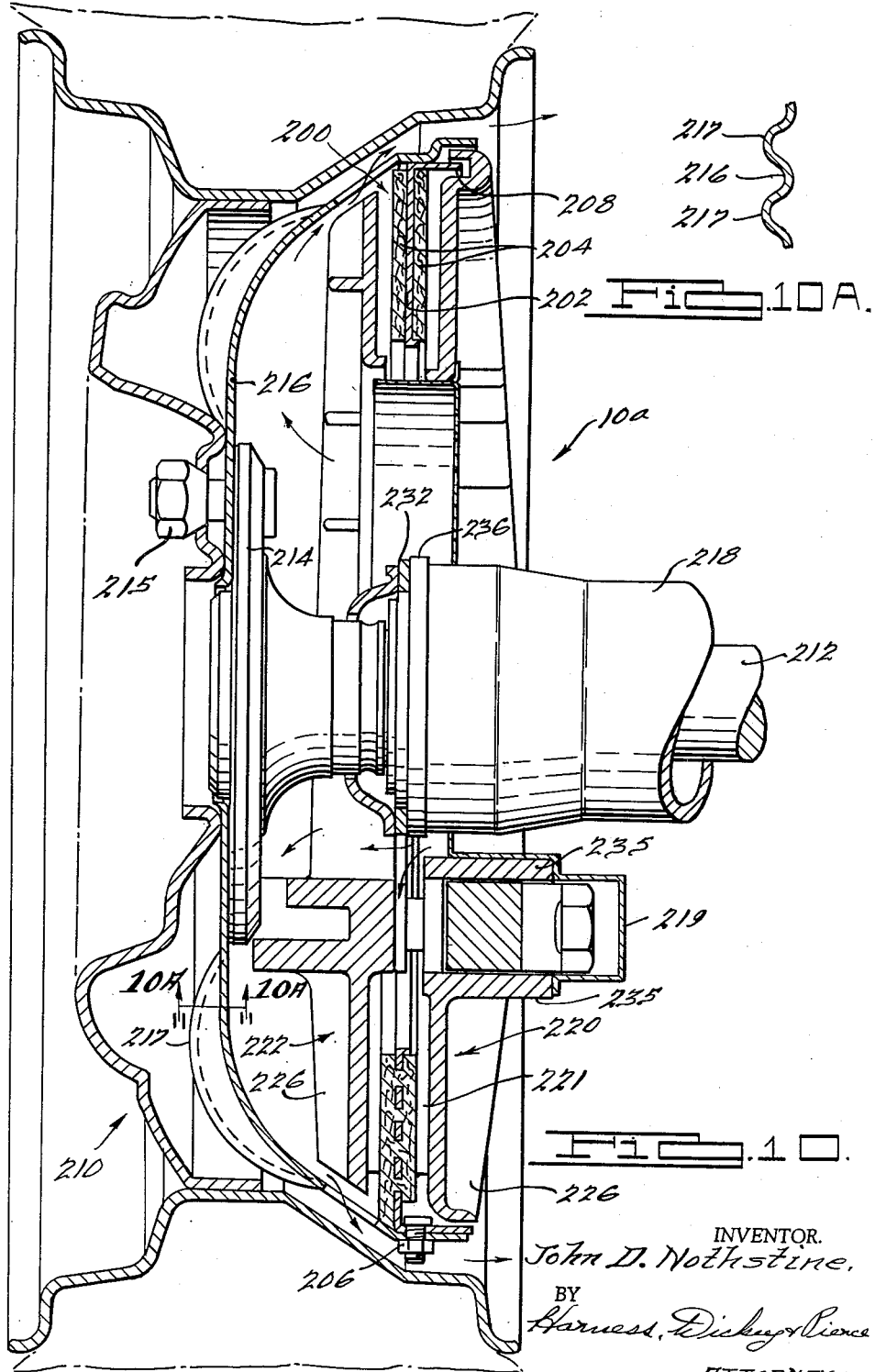
INVENTOR.
John D. Nothstine,
BY
Harness, Dickey & Pierce
ATTORNEYS.

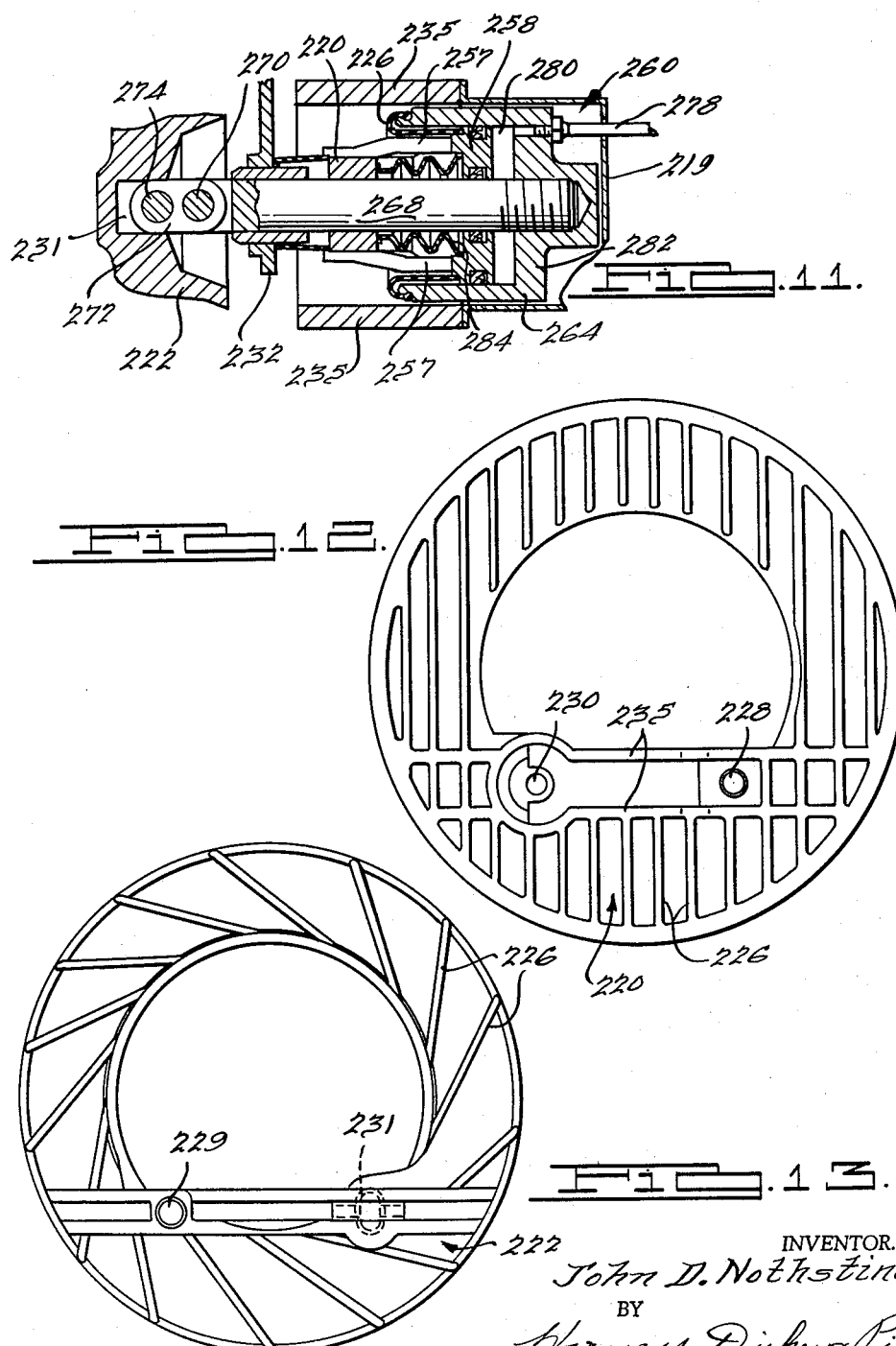

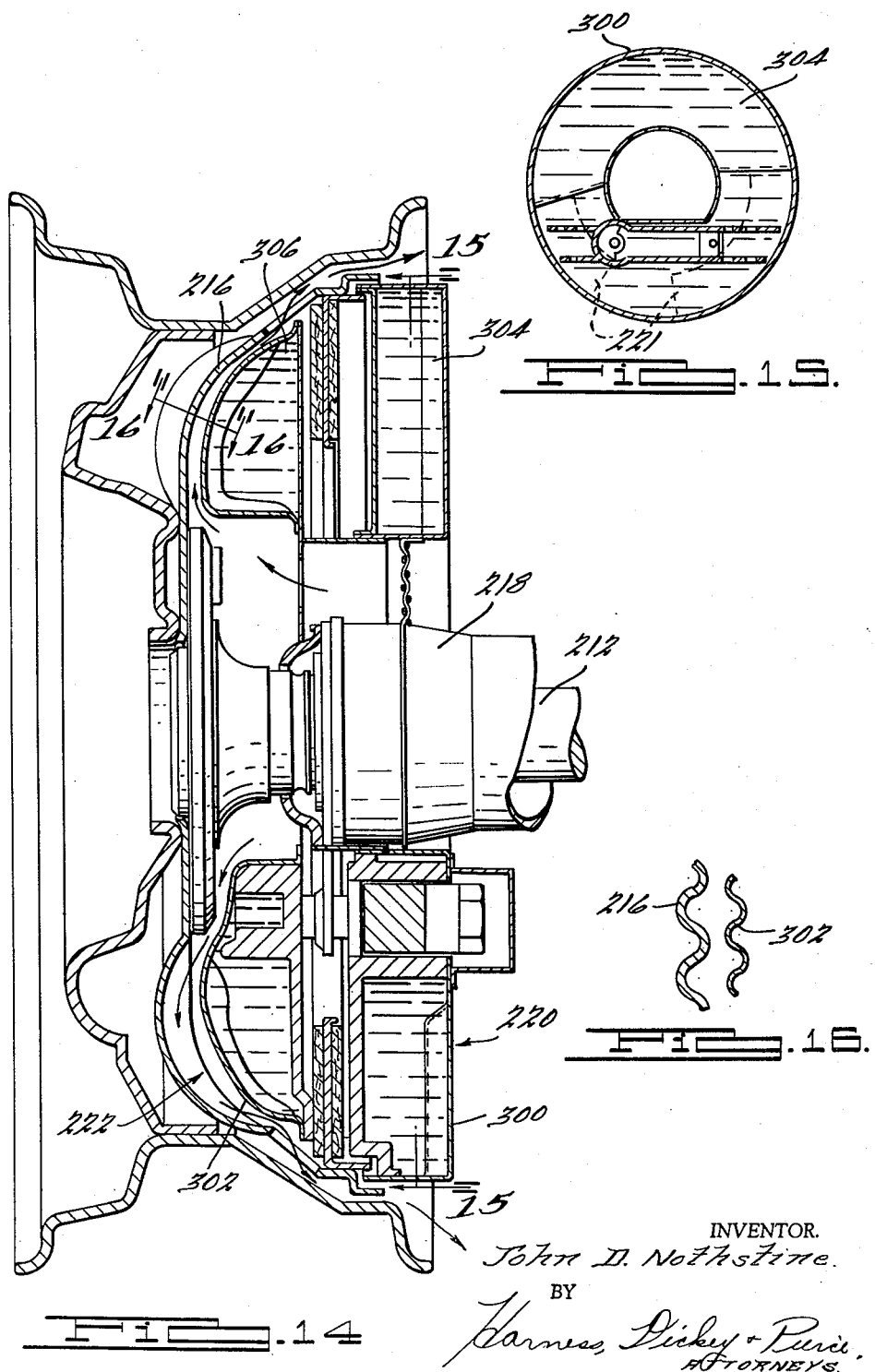

United States Patent Office 2,961,072
Patented Nov. 22, 1960

2,961,072

DISK BRAKE

John D. Nothstine, 27628 W. Chicago, Livonia, Mich.

Filed Feb. 3, 1958, Ser. No. 712,915

9 Claims. (Cl. 188—72)

This invention relates generally to brake assemblies and more particularly to a brake assembly of disk type.

Many present-day brakes rely on external brake applying power source. In the brake assembly of this invention, a lever arrangement provides a mechanical advantage of sufficient magnitude to enable the brake operator to supply all of the necessary brake applying force. Furthermore, the brake assembly of this invention is operable with a minimum of pedal movement by the brake operator by virtue of the inclusion of a movement compensating mechanism in the assembly which operates to take up all the slack and clearances in the assembly when the brake is applied.

The principal object of this invention, therefore, is to provide an improved brake assembly which includes movement compensating and mechanical advantage features; one in which the braking force on the disk is limited to compression only, without any bending, and is accomplished by squeezing the disk between a pair of shoes; a compact assembly in which the braking surfaces are shielded from dirt, or other foreign matter; an assembly in which stationary shoes are utilized for dissipating the heat generated at the brake assembly during a braking operation and in which air is circulated about the shoes for cooling purposes; in which the shoes coact to exert equal forces on opposite sides of the disk; an assembly in which water cooled shoes are readily installed; and one which is simple in construction, economical to manufacture, and efficient in operation in accomplishing a braking operation with a minimum of pedal travel and manual effort.

Further objects, features and advantages of this invention will become apparent from a consideration of the following description, the appended claims and the accompanying drawings in which:

Figure 1 is a fragmentary elevational view of the inner side of a vehicle wheel provided with the brake assembly of this invention, with some parts broken away for the purpose of clarity;

Figure 2 is an enlarged sectional view looking along the line 2—2 in Figure 1;

Figure 3 is an enlarged sectional view looking along the line 3—3 in Figure 2;

Figure 4:
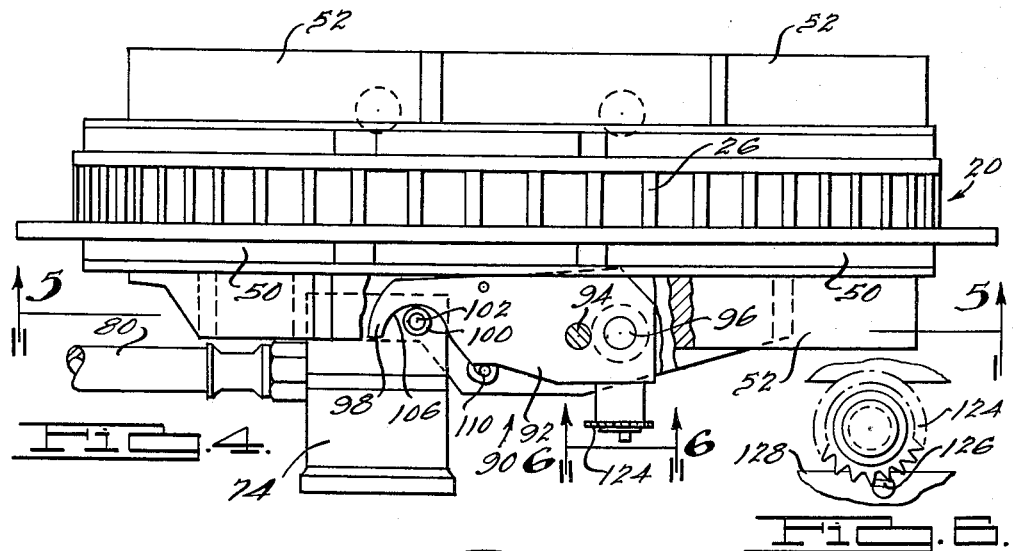
Figure 4 is a top plan view, with some parts broken away and other parts shown in section for the purpose of clarity, of the brake assembly of this invention.
Figure 5:
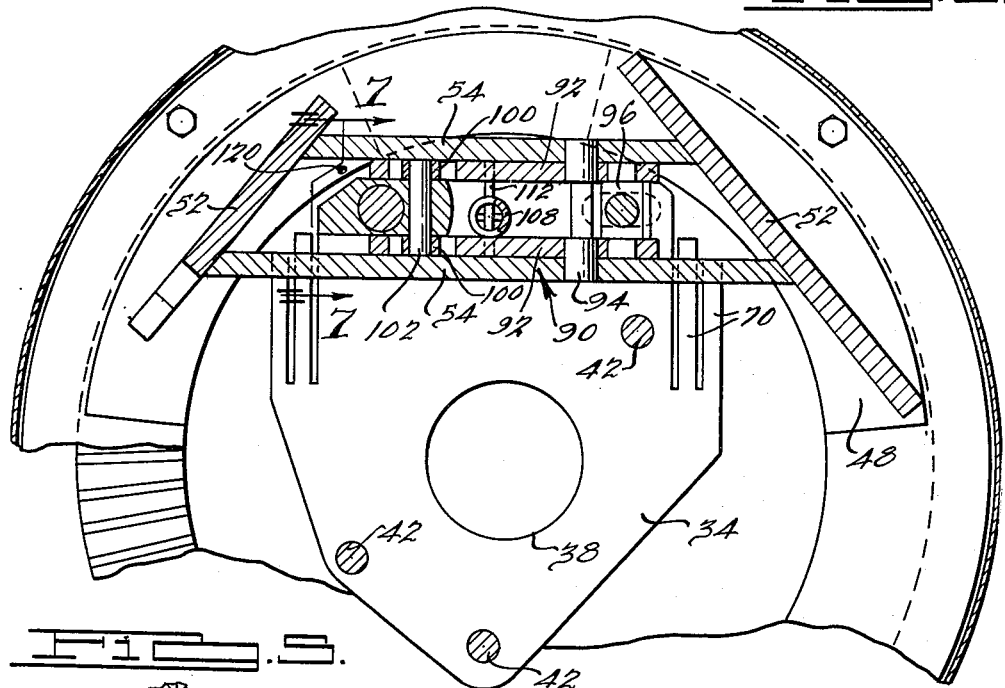
Figure 7:
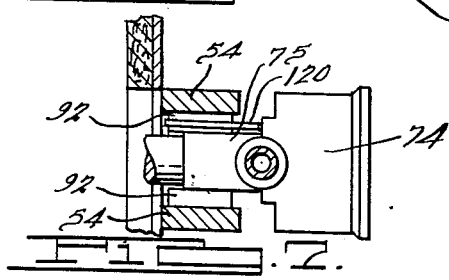

Figures 5 and 6 are views looking substantially along the lines 5—5 and 6—6, respectively, in Figure 4;

Figure 7 is a fragmentary sectional view looking along the line 7—7 in Figure 5;

Figure 8 is a fragmentary elevational view of the inner side of a vehicle wheel provided with a modified form of the brake assembly of this invention and with the dust shield for the assembly removed;

Figures 9, 10 and 11 are enlarged sectional views looking along the lines 9—9, 10—10 and 11—11, respectively, in Figure 8;

Figure 10A is a fragmentary sectional view looking substantially along the line 10A—10A in Figure 10;

Figures 12 and 13 are plan views of the brake shoes in the modified form of the brake shoe assembly of this invention;

Figure 14 is a vertical sectional view similar to Figure 10 showing the modified form of the brake assembly of this invention provided with water cooled brake shoes;

Figure 15 is a reduced vertical sectional view looking along the line 15—15 in Figure 14; and Figure 16 is a fragmentary sectional view looking substantially along the line 16—16 in Figure 15.

With reference to the drawings, the brake assembly of this invention, indicated generally at 10, is illustrated in Figures 1 and 2 in assembly relation with a vehicle front wheel 12 bolted to a hub 14 which is carried on a bearing 16 supported by the front wheel spindle 18. The brake assembly 10 includes a disk unit 20 consisting of a pair of flat rings or annular plates 22 and 24 connected by a plurality of flat heat dissipating fins 26. The unit 20 is readily cast in a single piece.

A flange 28 on the inner ring 22 is connected to an adjacent flange 30 on a brake drum 32 which is in turn secured to a flange 36 on the wheel hub 14. Accordingly, the disk unit 20 is rigidly connected to the hub 14 for rotation therewith. The disk unit 20 extends about an irregularly shaped brake shoe mounting plate 34 (Figs. 2 and 5) having a central spindle receiving opening 38. The plate 34 is secured to a spindle flange 40 by bolts 42.

A pair of inner and outer brake shoe assemblies 44 and 46 (Fig. 2) are mounted opposite the inner and outer disk rings 22 and 24, respectively, for the brake disk unit 20. Each shoe assembly 44 and 46 includes a semi-ring shape shoe member 48, provided on one side with the usual brake lining 50 and on the opposite side with a pair of diagonal stiffener braces 52 connected by a pair of flat substantially horizontal spaced straps 54.

A pair of bolts 56 and 58 (Fig. 3) which extend transversely of the mounting plate 34 at a position below the brake shoes 48 are supported at their outer ends on upright pivots 60 and 62, respectively, carried by the outer brake shoe assembly 46 and have their inner ends extended between the connecting straps 54 for the inner shoe assembly 44. The bolt 56 is slidably supported in a bushing 64 carried by the mounting plate 34 adjacent the upper end thereof, and the bolt 58 extends through an enlarged slot 66 in the mounting plate 34 at a position to one side of the bushing 64. A reinforcing strap 68 is secured to the plate 34 adjacent its upper end and in the area of the bushing 64 and slot 66 for the purpose of strengthening the portion of the plate 34 to which loads are applied. On opposite sides of the bolts 56 and 58 the supporting plate 34 is provided with outwardly bent spring legs or tangs 70 which engage the lower straps 54 for the shoe assemblies (Fig. 2) and act to normally maintain the shoe assemblies 44 and 46 in positions spaced from the disk unit 20.

For moving the shoe assemblies 44 and 46 against the disk unit 20 and against the pressure of the tangs 70, a hydraulic cylinder assembly, indicated generally at 72 in Fig. 3, is mounted on the bolt 56. The assembly 72 includes a cylinder member 74 slidably mounted on and arranged in a fluid sealed relation with the bolt 56, and a piston member 76 secured to the terminal end of the bolt 56 and slidably mounted in a cavity 78 in the cylinder 74. Fluid under pressure admitted to the cavity 78 through a hydraulic line 80 connected to the cylinder 74 exerts oppositely directed forces on the inner side of the piston 76 and an end wall 82 of the cylinder 74 at one end of the cavity 78 for moving the piston 76 and the wall 82 in directions away from each other. A compression spring 84 which extends between the outer side of the piston 76 and the cylinder end wall 86 resiliently opposes relative movement of the piston and cylinder in response to fluid supplied to the cavity 78.

A lever assembly, indicated generally at 90 (Figs. 4 and 5), cooperates with the piston and cylinder assembly 72 to provide for movement of the shoe assemblies 44 and 46 toward each other in response to a supply of fluid under pressure to the cylinder 74. The lever assembly 90 includes a pair of lever members 92 pivotally mounted on the bolt 58, hereinafter referred to as a wear adjustment bolt for convenience of description, and located between the straps 54 for the shoe assembly 44. Each lever member 92 is of the irregular shape illustrated in Fig. 4 and is pivotally mounted intermediate the ends thereof on a pivot 94 carried by the straps 54 for the shoe assembly 44. An inner extension 75 of the cylinder 74 is slidably supported between the free ends of the levers 92.

A second pivot 96 carried by the wear adjustment bolt 58 pivotally supports one end, namely, the right end as viewed in Fig. 4, of each of the levers 92. The opposite end of each lever is of a hook shape and engages a roller 100 carried by an upright pin member 102 mounted on and extended in opposite directions from the cylinder extension 75. A curved substantially semi-circular shape edge surface 106 at the hook end of each lever 92 engages the corresponding roller 100 so that the roller is movable along the surface 106. A tension spring 108 connected at one end to a first pin 110 extended between the straps 54 and at its opposite end to another pin 112 extending between the levers 92 maintains the levers 92 in continuous engagement with the rollers 100.

It can thus be seen that the shoe assemblies 44 and 46 are connected by the bolt 58 so that they automatically exert equal squeezing forces on the disk unit 20. In addition, by virtue of the pivotal support of the bolt 58 on the pivot 62 carried by the shoe assembly 46, the assembly 44 is longitudinally movable relative to the assembly 46.

In operation, assume that the vehicle on which the wheel 12 is mounted is moving in a direction which provides for movement of the top side of the disk unit 20 toward the left as viewed in Figs. 4 and 5. To apply the brakes, the operator exerts foot pedal pressure to in turn force fluid under pressure through the line 80 into the cavity 78 in the cylinder 74 (Fig. 3). This fluid pressure forces the cylinder wall 82 and the piston 76 away from each other, so that the bolt 56 acts to draw the shoe assembly 46 toward the disk unit 20. Likewise, the rollers 100 act on the levers 92 to swing the levers in a clockwise direction as viewed in Fig. 4 to in turn exert forces on the pin 94 moving the shoe assembly 44 toward the disk unit 20.

When the shoe assembly 44 has been moved inwardly toward the disk unit 20 sufficiently to engage the shoe lining 50 with the disk unit 20, the frictional force of the disk unit 20 on the lining 50 moves the shoe assembly 44 toward the left as viewed in Fig. 4. During such movement of the shoe assembly 44 to the left, the bolt 58 swings about the pivot 62 and moves in the slot 66. Since the lever assembly 90 is carried by the shoe assembly 44, the lever assembly 90 moves with the shoe assembly to in turn provide for movement of the levers 92 relative to the rollers 100, causing the rollers 100 to ride along the lever edge surfaces 106, swinging the levers 92 clockwise as viewed in Fig. 4. Such swinging movement provides for movement of the pin 94 toward the disk unit 20 to in turn move the shoe assembly 44 more tightly against the disk unit 20. The reaction force to this movement of the shoe assembly 44 is applied to the pivot 96 on the bolt 58, and acts to pull the assembly 46 toward the unit 20 so that the shoe forces on the disk unit 20 are substantially equal.

When the brakes have been fully applied, so that the shoe assemblies 44 and 46 cannot be moved more tightly against opposite sides of the disk unit 20, further movement of the shoe assembly 44 toward the left as viewed in Figs. 3 and 4, with the consequent movement of the rollers 100 along the levers 92, causes the cylinder 74 to move outwardly to in turn force hydraulic fluid back through the line 80, compensating for the initial cylinder and piston travel required to move the brake lining 50 against the disk unit 20.

Since the rollers 100 are located substantially at the centers of the curved lever edge 106 and the rod 58 is located in the center of the slot 66, the operation is identical when the wheel is moving in an opposite direction so that the disk unit 20 moves toward the right as viewed in Fig. 4.

To reduce the amount of initial piston travel a tickler spring 120 consisting merely of a resilient rod can be interposed between the cylinder 74 and the shoe assembly 44 so that on an initial supply of fluid under pressure the cylinder 74 moves the spring 120 directly against the shoe assembly 44 to cause the shoe to drag against the disk unit 20. The frictional force of the disk unit 20 on the shoe assembly 44 moves the assembly 44 and the lever assembly 90 into the movement compensated position, at which point the lever assembly receives the actuating force from the cylinder 74 through the rollers 100. Consequently, when the spring 120 is used, the operator does not experience first a depression of the brake pedal and a later partial return of the pedal in an opposite direction. Since the amount of compensation depends on the distance between the centers of the semi-circular edge surfaces 106 and the rollers 100, any desired amount of movement compensation can be achieved in the brake assembly 10 by varying the size of the rollers 100 and the lever surfaces 106.

To release the braking force of the shoe assemblies 44 and 46 on the disk unit, the brake pedal is released so that the hydraulic pressure in the line 80 is reduced. Accordingly, the forces on the bolts 56 and 58 and the levers 92 acting to move the shoe assemblies against the disk unit 20 are released so that the tangs 70 operate again to hold the shoe assemblies 44 and 46 in positions spaced from the disk unit 20.

To compensate for brake wear a nut 122 is threaded onto the outer end of the bolt 58 and carries a ratchet member 124 which engages a pawl 126 on a portion 128 of the lower lever 92. In the event the swinging movement of the lever assembly 90 about the pivot 94 necessary to provide the required drag of the shoe assembly 44 on the disk unit 20 becomes excessive, which condition exists when the brake lining 50 has become worn, the pawl 126 acts on the ratchet member 124 to advance the nut 122 in a direction such that the nut 122 moves the pivot 96 toward the pivot 62 to in turn move the shoe assemblies 44 and 46 toward each other. Such movement compensates for shoe wear.

It is seen, therefore, that this invention provides a brake assembly 10 in which a lever assembly 90 cooperates with the usual hydraulic actuating mechanism to provide the brake assembly with a mechanical advantage such that the brake operator must exert only a small force to apply the brakes. Furthermore, the brake assembly of this invention is constructed so that the piston and cylinder assembly 72 coacts with the lever assembly 90 to provide an automatic compensating mechanism for taking up all the slack in the system so that only a small brake pedal movement is required each time the brakes are applied. Since the shoe assemblies 44 and 46 are connected through the bolt 58, the forces applied by the shoe assemblies to the disk unit 20 are maintained equal without requiring any expensive calipers or the like as in conventional mechanisms. A shield member 130 of irregular shape (Fig. 2) is mounted on the spindle 18 inwardly of the shoe assembly 44 and coacts with the drum 32 to provide a housing for the assembly 10. The annular shape of the disk unit 20 with the spaced rings 22 and 24 and the fins 26 provides for an outward travel of cooling air between the fins through openings (not shown) in the drum to prevent overheating of the disk unit 20.

It is apparent that while the brake assembly 10 has been described in connection with the front wheel 12, it is equally applicable to a rear wheel, in which case it is mounted on the vehicle rear axle instead of the front spindle 18.

A modified form of the brake assembly of this invention, indicated generally at 10a, is illustrated in Figs. 8–13, inclusive. The brake assembly 10a, as will be described in detail hereinafter, requires fewer working parts and utilizes a full three hundred sixty degree friction surface on the brake disk.

The brake assembly 10a includes a brake disk unit 200 which consists of an annular plate 202 provided on opposite sides with linings 204 of a material having a high coefficient of friction. The brake assembly 10a is illustrated in assembly relation with a vehicle rear wheel 210 mounted on a rear axle 212 having a housing 218 and a hub flange 214. The wheel 210 and a brake drum 216 therefor are secured by bolts 215 to the flange 214.

The drum 216 is curved inwardly of the wheel 210 and is secured by bolts 206, only one of which appears in Fig. 10, to a laterally extended outer flange 208 on the annular plate member 202.

As shown in Figs. 10 and 10A, the drum 216 is formed with pockets or cups 217 which act like fan blades to draw cooling air into the assembly 10a along the lines indicated by the arrows in Fig. 10.

Inner and outer brake shoes 220 and 222, respectively, are arranged on opposite sides of the brake disk unit 200 and are provided with contact pads 221 movable into engagement with the linings 204 to operate the brake assembly 10a. A dust shield 219 is assembled with the inner brake shoe 220 as shown in Figs. 9, 10 and 11. The brake shoes 220 and 222 are shown in detail in Figs. 12 and 13, respectively, as being of an annular shape and are readily cast of aluminum or the like with integral heat dissipating ribs 226. The ribs 226 on the shoe 222 radiate outwardly from a central portion of the shoe and the ribs 226 on the shoe 220 are substantially vertical. Pairs of mounting openings 228, 230, and 229, 231 are formed in the shoes 220 and 222, respectively, for a purpose to appear presently. In addition, the shoe 220 is formed with substantially horizontal bridge or strap members 235 arranged on opposite sides of the openings 228 and 230, also for a purpose to appear presently.

The brake shoes 220 and 222 are movably supported on a mounting plate 232 secured by bolts 234 to a flange 236 on the axle housing 218. As best appears in Figs. 8 and 9, the mounting plate 232 has a pair of depending ears 238 and 239 provided with a pair of openings 240 and 242, respectively, corresponding to the openings 228, 229, 230 and 231 in the brake shoes 220 and 222.

The brake shoes 220 and 222 are positioned on opposite sides of the disk unit 200, in an encircling relation with the axle 212, and the disk unit 200 is located such that the plate 202 therefor is substantially in the plane of and encircles the mounting plate 232 (Fig. 10). A bolt 244 extends through the opening 228 in the shoe 220 and the opening 240 in the mounting plate 232, and is threaded into a boss 246 formed on the shoe 222 in a surrounding relation with the opening 229. A lever member 248 positioned between the bridge members 235 on the shoe 220 is mounted intermediate its ends on an upright pivot 250 carried by the bridge members 235 so that a bifurcated end portion 252 of the lever 248 extends partially about the bolt 244 and engages the bolt head 254.

The opposite end 256 of the lever 248 (Fig. 9) is also of a fork shape, having vertically spaced portions 257 (Fig. 11), and engages one side of the piston member 258 in a piston and cylinder assembly 260 also mounted between the bridge members 235. In addition to the piston member 258, the assembly 260 includes a cylinder member 264, which slidably supports the piston 258 and is connected thereto by a resilient seal member 266 and a rod member 268 secured at one end to the cylinder member 264 and slidably supported in the piston 258. The rod 268 extends through the opening 230 in the shoe 220 and the opening 242 in the mounting plate 232.

The rod 268 terminates in the opening 231 in the shoe 222 where the rod carries a transversely extending pin 270 which supports one end of a short link 272, the opposite end of which is pivotally supported on a transverse pin 274 supported in a boss 276 which surrounds the opening 231 in the shoe 222. A conduit 278 (Fig. 11) is secured to the cylinder member 264 for supplying fluid to a chamber 280 formed between the piston 258 and an end wall 282 for the cylinder member 264. A bellows-type seal 284 surrounds the rod 268 and extends between the shoe 220 and the piston 258.

A coil spring 285 extends between the dust shield 219 and the lever 248 which in turn engages the piston 258 so that the spring 285 acts to urge the piston toward the cylinder end wall 282.

In the operation of the brake assembly 10a, irregularities in the planar shape of the disk unit 200 maintain the shoes in a clearance relation with the disk unit 200. In the event the brake assembly 10a is to be operated, fluid under pressure is delivered through the line 278 to the chamber 280 for moving the piston 258 and the cylinder end wall 282 in directions away from each other. Movement of the piston 258 operates through the lever 248 to exert a force on the shoe 220 acting in the direction of the disk unit 200. Movement of the cylinder end wall 282 pulls the rod 268 which operates through the link 272 to pull the shoe 222 into engagement with the disk unit 200. Immediately on engagement of the shoe 222 with the disk lining 204 the frictional force of the rotating lining on the shoe 222 operates to rotate the shoe 222 in the direction of rotation of the disk unit 200 (counterclockwise as viewed in Fig. 13 for forward vehicle motion) about the bolt 244 as a pivot.

Such rotation acts through the link 272 to exert a pull on the rod 268 acting to move the cylinder end wall 282 toward the piston 258. It is apparent that a ramp and roller assembly is equally useful in applying a pull on the rod 268 and the term "lever means" as used herein is intended to cover such a ramp and roller assembly. This force on the cylinder 264 operates through the fluid in the chamber 280 and the piston 258 to exert a force on the lever 248 tending to rotate the lever 248 in a clockwise direction, as viewed in Fig. 9. Such rotation exerts a force on the pivot member 250 tending to increase the pressure of the brake shoe 220 on the disk unit 200. In addition, the lever 248 acts through the engagement of the end 252 thereof with the bolt head 254 to exert a force on the shoe 222 acting to further move the shoe 222 against the disk unit 200.

It can thus be seen that the pivotal movement of the brake shoe 222 about the bolt 244 operates automatically to provide for a continually increasing squeezing force of the brake shoes 220 and 222 on the disk unit 200 to progressively restrain rotation of the disk unit 200 and apply the brake assembly 10a. It is apparent that when the brake shoes 220 and 222 have been moved toward each other as far as they will go, the force of the brake shoe 222 on the rod 268 may move the cylinder end wall 282 and the piston 258 toward each other to actually force fluid back through the line 278 to raise the brake pedal. In any event, the drag of the brake disk unit 200 on the shoe 22 is utilized, as in the assembly 10, to provide for a coaction of the lever 248 and the piston and cylinder assembly 260 to in turn provide an automatic compensating mechanism for taking up all the slack in the brake system on initial brake application so that only a small brake pedal movement is required when the brakes are applied.

The brake lining 204 is of the usual fibrous material which is an insulator and very poor conductor of heat. Consequently, during a braking operation the shoes 220 and 222 take up most of the heat with very little heat being transferred to the disk plate 202. The provision of the ribs 226 on the shoes provides for the shoe heat being readily dissipated. Furthermore, the air drawn into the assembly 10a by the vanes 217 facilitates cooling of the shoes 220 and 222. Since the contact pads 221 on the shoes 220 and 222 are of a combined length less than the circumference of the disk unit 200, each portion of the lining 204 has an opportunity to be cooled in between successive engagements with the pads 221.

In Fig. 14, the brake shoes 220 and 222 are shown provided with back wall members 300 and 302, respectively, so as to form sealed chambers 304 and 306, respectively, between the shoes and their back walls, which are corrugated to facilitate heat transfer therefrom. A suitable anti-freeze fluid fills the chambers 304 and 306 for conducting heat away from the contact pads 221 which are at the bottom portions of the shoes. The fluid in the bottom of a chamber 304 or 306 is thus heated when the brakes are applied and rises to the top of the chamber where it displaces cool fluid. This action sets up a fluid circulation which provides an efficient means for preventing overheating of the shoes 220 and 222.

Although the invention has been described with respect to several embodiments thereof, it is to be understood that it is not to be so limited, since changes can be made therein which are within the scope of this invention as defined by the appended claims.

What is claimed is:

1. A brake assembly for a vehicle wheel comprising a disk unit adapted to be secured to the wheel for rotation therewith, a stationary mounting plate, a pair of brake shoes arranged on opposite sides of said mounting plate, means including said mounting plate for supporting one of said shoes for movement in the direction of rotation of said disk unit and for movement into frictional engagement with said disk unit, a lever member mounted on said one shoe, linkage means connecting said lever member to the other one of said shoes so that on swinging movement of the lever member in one direction said shoes are moved in directions toward said disk unit, a hydraulic cylinder and piston assembly carried on said mounting plate and connected to said one shoe for moving the shoe toward said disk unit on actuation of said assembly, and coacting cam and cam follower means on said lever member and said cylinder providing for movement of said lever member in said one direction in response to movement of said one shoe in the direction of rotation of said disk unit on initial frictional engagement therewith.

2. A brake assembly for a vehicle wheel comprising a disk unit adapted to be secured to the wheel for rotation therewith, a pair of brake shoes arranged on opposite sides of said disk unit for frictional engagement therewith, means mounting one of said shoes for movement in the direction of rotation of said disk unit on frictional engagement therewith, means connecting said shoes, and means including a lever member mounted on one of said shoes and associated with said connecting means for moving said shoes toward each other on movement of said one shoe in said direction of rotation.

3. A brake assembly for a vehicle wheel comprising a brake disk attached to said wheel for rotation therewith, a pair of brake shoes arranged on opposite sides of said disk for movement toward each other into frictional engagement with opposite sides of said disk, a shaft member extending between and connected to of said shoes, a lever member pivotally mounted in mediate the ends thereof on the other one of said sh and engageable at one end with said shaft so that on r tion of said lever member in one direction said shoes moved toward each other, and means connected to s one of said shoes and engageable with the opposite of said lever member for moving said lever member said one direction, said means being operated to m said lever member in response to movement of said shoe about said shaft member on frictional engagem of said one shoe with said brake disk on actuation said brake assembly.

4. A brake assembly for a vehicle wheel comprisin brake disk attached to said wheel for rotation therew a pair of brake shoes arranged on opposite sides of s wheel for movement toward each other into frictio engagement with opposite sides of said disk, means oc atively associated with said brake shoes for moving shoes toward each other, means operatively associa with the shoes for moving the shoes tightly against posite sides of said disk in response to movement of c of the shoes in the direction of rotation of said disk u on frictional engagement therewith, and lever means as ciated with said shoes for multiplying the effect of shoe moving forces applied to said assembly.

5. A brake assembly for a vehicle wheel comprisin brake disk attached to the wheel for rotation therew a pair of brake shoes arranged on opposite sides of disk and mounted for movement into frictional enga ment with opposite sides of the disk on application of brake assembly, means mounting one of said brake sh for movement in the direction of rotation of said disk frictional engagement therewith, means engageable w said one brake shoe for limiting movement thereof said one direction, articulated linkage means extend between said shoes and operable on movement of s one shoe in said direction to move said shoes tigh against opposite sides of said disk, brake applying le means mounted on one of said shoes and connected to other shoe for moving said shoes in directions tow: opposite sides of the disk on swinging of said lever one direction, and means for swinging said lever in s: one direction.

6. A brake assembly for a vehicle wheel compris: an upright brake disk attached to the wheel for rotati therewith, a pair of brake shoes arranged on oppos sides of the disk, pad members on said shoes adjacent t lower portions thereof frictionally engageable with s: disk unit, fluid chamber means on said shoes extendi upwardly from adjacent said pad members, means mou ing one of said brake shoes for movement in the dir tion of rotation of said disk on frictional engagement said pad members therewith, means engageable with s: one brake shoe for limiting movement thereof in said c direction, articulated linkage means extending betwe said shoes and operable on movement of said one sh in said direction to move said shoes tightly against op} site sides of said disk, brake applying lever means mou ed on one of said shoes and connected to the other sh for moving said shoes in directions toward opposite sic of the disk on swinging of said lever in one direction, a means for swinging said lever in said one direction.

7. A brake assembly for a vehicle wheel comprising annular brake disk attached to the wheel for rotati therewith, a stationary mounting plate arranged adjace said brake disk, a pair of annular brake shoes arrang on opposite sides of the disk and mounting plate, r means on said mounting plate extending through s: shoes and providing a shaft about which one of said shc is rotatable on frictional engagement with said disk ur a link member mounted on the other one of said shc and connected to said one shoe at a position spaced fro said rod means, said shoes being connected so that response to said rotation thereof said link member pulled in a direction to move the other one of said shc tightly against said disk unit, and lever means on said other shoe operable by said link member and connected to said shoe members so as to move the shoe members against the disk in response to said pulling of said link member.

8. A brake assembly for a vehicle wheel comprising an upright brake disk attached to the wheel for rotation therewith, a stationary mounting plate arranged adjacent said brake disk, a pair of brake shoes arranged on opposite sides of said disk and mounted on said plate for movement into frictional engagement with said disk, rod means on said mounting plate connected at one end to one of said shoes and provided at the opposite end with a head, a lever member pivotally connected intermediate the ends thereof on said other shoe for pivoted movement in a plane substantially perpendicular to said disk unit, said lever member having one end engaged with said head so that on swinging movement in one direction said rod means is moved in a direction to pull said one shoe toward said disk member, a hydraulic cylinder assembly having cylinder and piston means movable in opposite directions on actuation of the assembly, one of said cylinder and piston means being engaged with the opposite end of said lever for moving the lever in said one direction on actuation of the assembly and the other one of said cylinder and piston means being connected to said one shoe for moving the shoe toward said disk on actuation of the cylinder assembly, and two-piece link means pivoted intermediate the ends for movement in a plane perpendicular to the disk connecting said one shoe and said other one of said cylinder and piston means.

9. In a wheel brake assembly, a disk unit mounted for rotation about a first axis, a pair of brake shoes arranged on opposite sides of the disk unit, one of said brake shoes being mounted for rotatable movement about a second axis spaced from said first axis, said one shoe being movable by the frictional force exerted thereon by said rotating disk unit on movement of the one shoe into engagement with the disk unit, and means connecting said shoes at a position spaced from said second axis and operable to move said shoes toward each other in response to said movement of the one shoe.

References Cited in the file of this patent

UNITED STATES PATENTS

| | | |
|---|---|---|
| 1,966,169 | Forbes | July 10, 1934 |
| 2,057,796 | Shelor | Oct. 20, 1936 |
| 2,127,557 | Ells | Aug. 23, 1938 |
| 2,133,597 | Tjaarda | Oct. 18, 1938 |
| 2,278,144 | Milan | Mar. 31, 1942 |
| 2,325,596 | Evans | Aug. 3, 1943 |
| 2,331,259 | Whitten | Oct. 5, 1943 |
| 2,548,008 | Franklin | Apr. 10, 1951 |
| 2,655,229 | Eksergian | Oct. 13, 1953 |
| 2,757,761 | Milan | Aug. 7, 1956 |
| 2,884,096 | Truemper | Apr. 28, 1959 |

FOREIGN PATENTS

| | | |
|---|---|---|
| 654,894 | Great Britain | July 4, 1951 |